Patented Dec. 19, 1939

2,183,997

UNITED STATES PATENT OFFICE 2,183,997

AZO COMPOUNDS AND PROCESS FOR COLORING THEREWITH

James G. McNally and Joseph B. Dickey, Rochester, N. Y., assignors to Eastman Kodak Company, Rochester, N. Y., a corporation of New Jersey No Drawing. Application February 20, 1937, Serial No. 126,887

21 Claims. (Cl. 8—50)

This invention relates to the art of dyeing or coloring. More particularly it relates to the dyeing or coloration of organic derivatives of cellulose with nuclear non-sulfonated aryl azo derivatives of 1,3-cyclohexadiones. The invention includes new aryl azo derivatives of 1,3-cyclohexadiones, the process of coloring materials, particularly material made of or containing an organic derivative of cellulose, with aryl azo derivatives of a 1,3-cyclohexadione and materials colored with said aryl azo derivatives.

Organic derivatives of cellulose are characterized by an indifferent affinity for the usual cotton or wool dyes, especially the ordinary water soluble dyes. Typical organic derivatives of cellulose include the hydrolyzed as well as the unhydrolyzed cellulose organic acid esters, such as cellulose acetate, cellulose formate, cellulose propionate or cellulose butyrate, and the hydrolyzed as well as the unhydrolyzed mixed organic acid esters of cellulose, such as cellulose acetate-propionate, cellulose acetate-butyrate, and the cellulose ethers, such as methyl cellulose, ethyl cellulose or benzyl cellulose.

It is an object of the present invention to provide a new class of dyes for the direct dyeing in an aqueous medium of textile materials, or for the coloration of these materials by printing or stenciling.

A particular object of the present invention is to provide a new class of dyes for dyeing materials, such as thread, yarn or fabric, made of or containing an organic derivative of cellulose, colors which are of exceptionally good light fastness.

Another object is to provide dyes which may be employed to color plastic materials by dissolving the dyes in organic solvents and incorporating the colored solutions in the plastic as a plasticizer or filler.

A further object is to provide dyes which may be employed to color oils.

Another object is to provide insoluble pigments.

We have discovered that the aryl azo derivatives of 1,3-cyclohexadiones constitute a generally valuable class of dye compounds which accomplish or may be used to accomplish the objects of our invention. The nuclear non-sulfonated aryl azo members are particularly advantageous in that they may be employed to color organic derivatives of cellulose, cellulose acetate silk, for example, pleasing shades of outstanding fastness to light and of good fastness to washing. The colors obtained employing the dye compounds of the invention range from greenish-yellow to red.

The nuclear non-sulfonated aryl azo derivatives of our invention may likewise be employed for the coloration of natural silk and wool. Further, said nuclear non-sulfonated aryl azo derivatives are, in general, water-insoluble and those which are water-insoluble may be ground up for use as organic pigments or they may be dissolved in suitable organic solvents and used to color lacquers, plastics, paints and artificial leather, for example. These compounds, however, have little or no applicability for the dyeing of cotton and regenerated cellulose under the conditions employed for dyeing cellulose acetate silk.

The nuclear sulfonated aryl azo compounds possess little or no utility for the dyeing of organic derivatives of cellulose but may be employed to dye natural silk, wool, regenerated cellulose and cotton by customary methods of application.

The compounds of our invention contain a 1,3-cyclohexadione nucleus or a 1,3-cyclohexadione nucleus which may be substituted in its 4, 5 and 6 positions. 1,3-cyclohexadione may be represented by the formula:

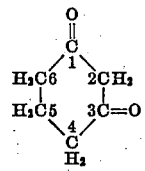

This compound is likewise known as dihydroresorcinol which may be represented by the formula:

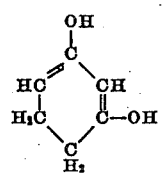

It will be understood that for the purposes of the present invention 1,3-cyclohexadione and dihydroresorcinol are one and the same. 1,3-cyclohexadione may be prepared as described in Liebig's Annalen, vol. 278, page 28. (1894)

To avoid confusion the 1,3-cyclohexadione terminology will be used throughout the specification and claims. The numbering employed will be as indicated in the formula given to represent 1,3-cyclohexadione.

The compounds of our invention have the general formula:

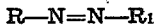

wherein R represents 1,3-cyclohexadione or a 1,3-cyclohexadione which may be substituted in its 4, 5 and 6 positions, and $R_1$ represents an aryl nucleus. Advantageously $R_1$ is an aryl nucleus of the benzene series. $R_1$ may contain nuclear substituents, as will be apparent hereinafter, and may be sulfonated or not depending on the purpose to which the compound is to be put.

While the azo compounds having the above general formula may be employed for the coloration of various materials, in accordance with the teachings of the present invention, we have found that the nuclear non-sulfonated aryl azo derivatives containing a nitro group on the aryl nucleus are generally advantageous for the dyeing of organic derivatives of cellulose and cellulose acetate silk in particular. Further, we have found that a limited class of the compounds disclosed herein is particularly advantageous for the dyeing of organic derivatives of cellulose. This class of compounds may be prepared by coupling a 5-alkyl-1,3-cyclohexadione or a 5,5-dialkyl-1,3-cyclohexadione with a diazotized amine selected from the class consisting of amines having the general formulae:

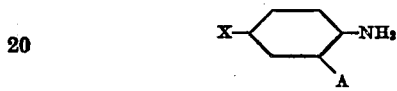

wherein A represents an alkyl group and X represents a member selected from the class consisting of a halogen atom and a nitro group,

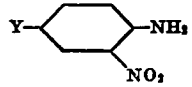

wherein Y represents a member selected from the class consisting of hydrogen, a halogen atom, an alkyl group and an alkoxy group, and

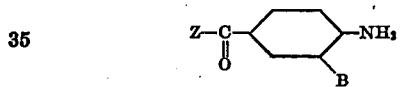

wherein B represents a member selected from the class consisting of a halogen atom and a nitro group and Z represents an alkyl group. It is to be noted that where the amine contains an alkyl or an alkoxy group it is advantageously a lower alkyl or alkoxy group or more specifically one containing not more than 4 carbon atoms.

It is not to be assumed from the foregoing that the aryl azo derivatives of 1,3-cyclohexadiones broadly are not good dyes as they are, in general, excellent dyes. Certain members, while useful, are, as would be expected, less advantageous than others. The aryl azo derivatives of the 1,3-cyclohexadiones having a carboxyl or a hydroxyl group on the aryl nucleus, while useful for the dyeing of cellulose acetate silk, have been found to be less advantageous for this purpose as the dyeings produced are less stable to light than those produced by derivatives not containing the carboxyl or hydroxyl group. Of all the compounds included within the scope of our invention the following constitute, to the best of our knowledge, the most outstanding dyes for organic derivatives of cellulose.

1. o-Nitro-p-chloro benzene-azo-5, 5-dimethyl-1, 3-cyclohexadione.
2. o-Nitro-p-bromo benzene-azo-5, 5-dimethyl-1, 3-cyclohexadione.
3. o-Nitro-p-fluoro benzene-azo-5, 5-dimethyl-1, 3-cyclohexadione.
4. o-Nitro-p-chloro benzene-azo-5-methyl-1, 3-cyclohexadione.
5. o-Nitro-p-bromo benzene-azo-5-methyl-1, 3-cyclohexadione.
6. o-Nitro-p-fluoro benzene-azo-5-methyl-1, 3-cyclohexadione.
7. o-Nitro-p-methyl benzene-azo-5, 5-dimethyl-1, 3-cyclohexadione.
8. o-Nitro-p-methyl benzene-azo-5-methyl-1, 3-cyclohexadione.
9. o-Methyl-p-nitro benzene-azo-5, 5-dimethyl-1, 3-cyclohexadione.
10. o-Methyl-p-nitro benzene-azo-5-methyl-1, 3-cyclohexadione.
11. o-Nitro-p-methoxy benzene-azo-5, 5-dimethyl-1, 3-cyclohexadione.
12. o-Nitro-p-methoxy benzene-azo-5-methyl-1, 3-cyclohexadione.
13. o-Chloro-p-aceto benzene-azo-5, 5-dimethyl-1, 3-cyclohexadione.
14. o-Chloro-p-aceto benzene-azo-5-methyl-1, 3-cyclohexadione.
15. o-Nitro-p-methoxy benzene-azo-5-methyl-1, 3-cyclohexadione.
16. o-Nitro-p-methoxy benzene-azo-5,5-dimethyl-1, 3-cyclohexadione.

Of these dyes Nos. 1 and 4 are the best.

In order that our invention may be fully understood a number of 1,3-cyclohexadiones which are substituted in one or more of their 4, 5 and 6 positions is given hereinafter.

5-methyl-1,3-cyclohexadione

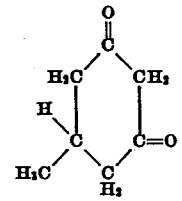

This compound is commonly known as 5-methyldihydroresorcinol. It may be prepared as described in Liebig's Annalen, vol. 308, page 192. (1899)

5,5-dimethyl-1,3-cyclohexadione

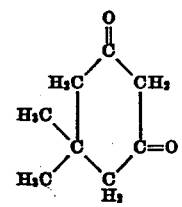

This compound is known also as 5,5-dimethyl-dihydroresorcinol. It may be prepared as described in Liebig's Annalen, vol. 308, page 193. (1899)

4-methyl-5,5-dimethyl-1,3-cyclohexadione

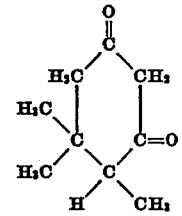

This compound may be prepared as described in Journal of the Chemical Society, vol. 79, page 141. (1901)

6-cyano-6-methyl-5-phenyl-1,3-cyclohexadione.

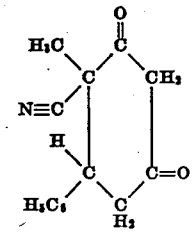

This compound may be prepared as described in Liebig's Annalen, vol. 294, page 287. (1897)

6-cyano-5-phenyl-1,3-cyclohexadione

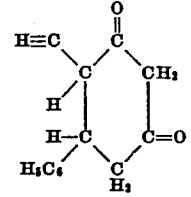

This compound may be prepared as described in Liebig's Annalen, vol. 294, pages 283 and 284. (1897)

5-cinnamyl-6-carbethoxy-1,3-cyclohexadione

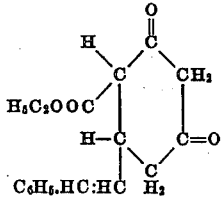

This compound may be prepared as described in Liebig's Annalen, vol 294, page 298. (1897)

4-phenyl-5-phenyl-1,3-cyclohexadione

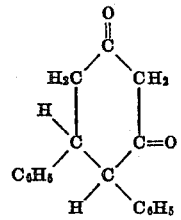

This compound may be prepared as described in Berichte der Deutschen Chemischen Gesellschaft, vol. 42, pages 4498 and 4499. (1909)

5-phenyl-1,3-cyclohexadione

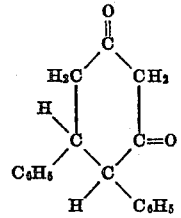

This compound may be prepared as described in Liebig's Annalen, vol. 294, page 302. (1897)

5-ethyl-1,3-cyclohexadione

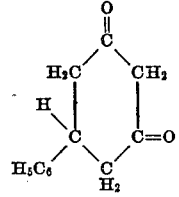

This compound may be prepared in a manner similar to that employed for preparing 5-methyl-1,3-cyclohexadione 5,5-diethyl-1,3-cyclohexadione

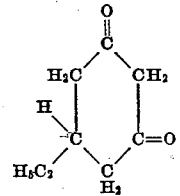

This compound may be prepared in a manner similar to that employed for preparing 5,5-dimethyl-1,3-cyclohexadione.

The compounds of the invention may be prepared by coupling a diazotized arylamine with a 1,3-cyclohexadione in an alkaline solution.

The following examples illustrate the method of preparation of the azo compounds of our invention.

*Example 1*

10.3 grams of 4-nitro-2,6-dichloroaniline are dissolved in 10–12 cc. of concentrated sulfuric acid, (sp. gr. 1.84) and the solution formed is added to a solution of 3.6 grams of sodium nitrite dissolved in 18–19 cc. of concentrated sulfuric acid, (sp. gr. 1.84). The resulting solution is cooled to 15° C. following which 150 cc. of glacial acetic acid are added and the whole allowed to stand one hour while it is cooled to 0° C. in an ice-salt bath.

7 grams of 5,5-dimethyl-1,3-cyclohexadione are dissolved in a solution of 325 grams of sodium carbonate in 4000 cc. of water and the resulting solution is cooled to below 10° C. The diazonium solution prepared above is added with stirring while maintaining a temperature below 10° C., by the addition of ice, for example, throughout the coupling reaction which takes place. Considerable frothing is caused by the liberation of carbon dioxide. The sodium salt of the dye precipitates almost immediately. Upon completion of the coupling reaction the mixture is permitted to stand for one hour, made acid to litmus with acetic acid and the precipitated dye is recovered by filtration, washed with water and dried. The product obtained has a greenish-yellow color.

The quantity of sodium carbonate added is that sufficient to keep the reaction alkaline throughout and to have a slight alkalinity when the reaction is complete.

*Example 2*

13.7 grams of o-phenetidine are dissolved in 200 grams of water containing about 36 grams of 36% hydrochloric acid. The resulting solution is cooled to a temperature approximating 0–5° C. by the addition of ice, for example, and diazotized, while maintaining a temperature of 0–5° C., by adding, with stirring, 6.9 parts of sodium nitrite dissolved in water.

14 grams of 5,5-dimethyl-1,3-cyclohexadione are dissolved in a solution of 36 grams of sodium carbonate in 75 cc. of water and the resulting solution is cooled to a temperature approximating 0° C. by the addition of ice. The diazonium solution prepared above is added fairly rapidly with stirring. A yellowish precipitate forms almost immediately. Upon completion of the coupling reaction, the mixture is allowed to stand for one hour, made acid to litmus with acetic acid and the precipitated dye is recovered by filtration, washed with water and dried. The product obtained is mustard-colored.

*Example 3*

13.6 grams of p-aminodimethylaniline are diazotized and coupled with 14 grams of 5,5-dimethyl-1,3-cyclohexadione dissolved in a solution of 36 grams of sodium carbonate in 75 cc. of water. The diazotization and coupling reactions may be carried out in accordance with the method described in Example 2. When coupling is complete the mixture is allowed to stand for one hour, made acid to litmus with acetic acid and the precipitated dye is recovered by filtration, washed with water and dried. The product obtained has a reddish-brown color.

*Example 4*

17.25 grams of o-nitro-p-chloroaniline are substituted for the o-phenetidine of Example 2 and the procedure therein described is followed. The product obtained has a yellowish color.

*Example 5*

10.9 grams of m-aminophenol are dissolved in 200 cc. of water to which has been added 50 cc. of 36% hydrochloric acid. The resulting solution is cooled to a temperature approximating 0–5° C. and diazotized by adding slowly, with stirring, a water solution of 6.9 grams of sodium nitrite.

14 grams of 5,5-dimethyl-1,3-cyclohexadione are dissolved in 200 cc. of water containing 31.8 grams of sodium carbonate. The resulting solution is cooled to a temperature not exceeding 10° C. and this temperature is maintained while adding, with stirring, the diazo solution prepared above. The addition requires about 5 minutes. The mixture is then allowed to stand for 4 hours in a cold place, made acid to litmus with acetic acid and the precipitated dye is recovered by filtration, washed with water and dried. The dye compound thus obtained is crystalline and has a brownish-red color.

Example 6

10.9 grams of p-aminophenol are substituted for the m-aminophenol of Example 5 and the procedure therein described is followed. A dark yellow colored product is obtained.

Example 7

13.7 grams of o-aminobenzoic acid are substituted for the m-aminophenol of Example 5 and the procedure described therein is followed. The product obtained has a light yellow color.

Example 8

16 grams of 1-amino-8-naphthol-2,4-disulfonic acid are dissolved in 200 cc. of water containing 11 grams of sodium carbonate. The solution thus formed is cooled to a temperature approximating 0° C. by the addition of ice and 7 grams of sodium nitrite dissolved in water are added with stirring. The resulting solution is then added fairly rapidly to a solution of 50 grams of 36% hydrochloric acid in 50 cc. of water and stirred until a faint test for nitrous acid is indicated on a starch-potassium iodide paper.

14 grams of 5,5-dimethyl-1,3-cyclohexadione are dissolved in a solution of 36 grams of sodium carbonate in 75 cc. of water and the resulting solution is cooled, by the addition of ice, to a temperature approximating 0° C. The diazo solution prepared above is added fairly rapidly with stirring. The solution becomes deep red and is permitted to stand for 8 hours. The desired dye compound is recovered by evaporating until crystallization commences, cooling, filtering and drying. The product obtained has a dark brown-black color.

Example 9

An equivalent molecular proportion of 1-amino-naphthalene-4-sulfonic acid is substituted for the 1-amino-8-naphthol-2,4-disulfonic acid of Example 8 and the procedure described therein is followed. The product obtained is orange colored.

Example 10

22.3 grams of 2-amino-naphthalene-$\alpha$-sulphonic acid, 40 grams of water and 40 grams of a 10% sodium hydroxide solution are mixed together and cooled. 6.9 grams of sodium nitrite are then added and the mixture is poured on ice containing 30 grams of 36% hydrochloric acid.

12.6 grams of 5-methyl-1,3-cyclohexadione are added to 50 cc. of water containing 4 grams of sodium carbonate and coupled with the diazo solution prepared above. When coupling is complete the mixture is made neutral to litmus with acetic acid and the dye is salted out by the addition of sodium chloride, filtered, washed and dried.

An equivalent molecular weight of 5-phenyl-1,3-cyclohexadione may be substituted, for example, for the 5-methyl-1,3-cyclohexadione of the example.

Example 11

5.4 grams of 1-amino-4-nitro-2-sulfonic benzene are dissolved in a solution of 1.4 grams of sodium carbonate in 50 cc. of water and the resulting solution is added to a well stirred mixture of ice and 19 cc. of an aqueous 10% (by weight) hydrochloric acid solution. 1.8 grams of sodium nitrite dissolved in 15 cc. of water are added with stirring and stirring is continued until diazotization is complete.

The diazo solution thus prepared is slowly added, with stirring, to an iced solution of 3.5 grams of 5,5-dimethyl-1,3-cyclohexadione and 4 grams of sodium carbonate. When coupling is complete the dye compound formed is salted out, recovered by filtration, washed and dried.

While the foregoing example relates primarily to the aryl azo derivatives of 5,5-dimethyl-1,3-cyclohexadione it is to be noted that the aryl azo derivatives of other 1,3-cyclohexadiones, such as those previously listed herein, may be prepared in similar fashion.

The following tabulation further illustrates the compounds included within the scope of our invention, together with the color they produce on cellulose acetate silk. The compounds indicated below may be prepared by diazotizing the amines listed under the heading "Amine" and coupling with the compounds specified in the column entitled "Coupling component." The diazotization and coupling reactions may be carried out in accordance with the general procedure disclosed in Examples 1–11, inclusive.

| Amine | Coupling component | Color on cellulose acetate silk |
|---|---|---|
| 1-amino-4-acetaminobenzene | 5,5-dimethyl-1,3-cyclohexadione | Yellow. |
| o-Chloroaniline | do | Green-yellow. |
| 1-amino-4-chloro-2-nitrobenzene | do | Do. |
| 1-amino-2,4-dichlorobenzene | do | Yellow. |
| o-Nitroaniline | do | Do. |
| m-Nitroaniline | do | Do. |
| p-Nitroaniline | do | Green-yellow. |
| 1-amino-2,6-dichloro-4-nitrobenzene | do | Do. |
| o-Ethoxyaniline | do | Do. |
| Benzidine | do | Orange. |
| 4-diethylamino-1-naphthylamine | do | Red. |
| p-Dimethylamino-p-aminoazobenzene | do | Do. |
| o-Toluidine | do | Yellow. |
| m-Toluidine | do | Orange. |
| p-Toluidine | do | Yellow. |
| o-Aminophenol | do | Do. |
| m-Aminophenol | do | Do. |
| p-Aminophenol | do | Do. |
| o-Aminobenzoic acid | do | Do. |
| m-Aminobenzoic acid | do | Do. |
| p-Aminobenzoic acid | do | Do. |
| 1-amino-2-methoxy-4-nitrobenzene | do | Do. |
| m-Chloroaniline | do | Do. |

| Amine | Coupling component | Color on cellulose acetate silk |
|---|---|---|
| o-Methoxyaniline | 5,5-dimethyl-1,3-cyclohexadione | Yellow. |
| 1-amino-4-dimethylaminobenzene | do | Red. |
| 1-amino-4-diethylaminobenzene | do | Do. |
| 1-amino-4-di-B-hydroxyethylaminobenzene | do | Do. |
| 1-amino-4,5-diethoxy-2-nitrobenzene | do | Orange. |
| 1-amino-3,4-diethoxybenzene | do | Do. |
| 1-amino-2,5-dichlorobenzene | do | Green-yellow. |
| m-Methoxyaniline | do | Do. |
| 1-amino-2-methoxy-5-nitrobenzene | do | Do. |
| Aniline | do | Yellow. |
| 1-amino-4-carbethoxybenzene | do | Do. |
| p-Bromoaniline | do | Green-yellow. |
| 1-amino-2-methyl-4-nitrobenzene | do | Do. |
| 1-amino-4-methyl-2-nitrobenzene | do | Do. |
| 1-amino-4-methoxy-2-nitrobenzene | do | Orange-yellow. |
| 1-amino-4-chloro-2-nitrobenzene | 1,3-cyclohexadione | Green-yellow. |
| p-Toluidine | do | Yellow. |
| 1-amino-4-dimethylaminobenzene | do | Red. |
| 1-amino-4-chloro-2-nitrobenzene | 4-methyl-5,5-dimethyl-1,3-cyclohexadione | Green-yellow. |
| 1-amino-4-bromo-2-nitrobenzene | do | Do. |
| 1-amino-2-methyl-4-nitrobenzene | do | Do. |
| o-Methoxyaniline | 6-cyano-6-methyl-5-phenyl-1,3-cyclohexadione | Orange-yellow. |
| 1-amino-4-chloro-2-nitrobenzene | do | Green-yellow. |
| m-Toluidine | do | Yellow. |
| p-Nitroaniline | 6-cyano-5-phenyl-1,3-cyclohexadione | Orange. |
| 1-amino-4-chloro-2-nitrobenzene | do | Yellow. |
| o-Nitroaniline | 5-cinnamyl-6-carbethoxy-1,3-cyclohexadione | Do. |
| m-Toluidine | do | Do. |
| 1-amino-4-bromo-2-nitroaniline | do | Green-yellow. |
| 1-amino-2-methyl-4-nitroaniline | do | Do. |
| 1-amino-2-acetaminobenzene | 4-phenyl-5-phenyl-1,3-cyclohexadione | Yellow. |
| 1-amino-4-diethylamino-3-nitrobenzene | do | Red-brown. |
| 1-amino-4-chloro-2-nitrobenzene | do | Green-yellow. |
| 1-amino-4-aceto-2-nitrobenzene | do | Do. |
| m-Methoxyaniline | 5-phenyl-1,3-cyclohexadione | Golden-yellow. |
| 1-amino-4-chloro-2-nitrobenzene | do | Green-yellow. |
| 1-amino-4-methyl-2-nitrobenzene | do | Do. |
| 1-amino-2-methyl-4-nitrobenzene | do | Do. |
| 1-amino-4-fluoro-2-nitrobenzene | do | Do. |
| 1-amino-4-bromo-2-nitrobenzene | do | Do. |
| 1-amino-4-chloro-2-nitro-benzene | 5-ethyl-1,3-cyclohexadione | Do. |
| 1-amino-4-bromo-2-nitro-benzene | do | Do. |
| 1-amino-4-methyl-2-nitro-benzene | do | Do. |
| 1-amino-2-methyl-4-nitro-benzene | do | Do. |
| 1-amino-4-aceto-2-nitro-benzene | do | Do. |
| 1-amino-4-chloro-2-nitro-benzene | 5,5-diethyl-1,3-cyclo-hexadione | Do. |
| 1-amino-4-bromo-2-nitro-benzene | do | Do. |
| 1-amino-4-methyl-2-nitro-benzene | do | Do. |
| 1-amino-2-methyl-4-nitro-benzene | do | Do. |
| 1-amino-4-aceto-2-nitro-benzene | do | Do. |
| 1-amino-4-chloro-2-nitro-benzene | 5-methyl-1,3-cyclohexadione | Yellow. |
| 1-amino-4-bromo-2-nitro-benzene | do | Do. |
| o-Nitroaniline | do | Do. |
| 1-amino-2-methyl-4-nitro-benzene | do | Do. |
| 1-amino-4-methyl-2-nitro-benzene | do | Do. |
| 1-amino-2-methyl-5-nitro-benzene | do | Do. |
| 1-amino-2-methoxy-5-nitro-benzene | do | Do. |
| 1-amino-2-methoxy-4-nitro-benzene | do | Do. |
| p-Aminoacetophenone | do | Do. |
| p-Aminoacetanilide | do | Do. |
| m-Aminoacetanilide | do | Do. |
| 1-amino-4-chloro-2-methyl-benzene | do | Do. |
| 1-amino-4-bromo-2-methyl-benzene | do | Do. |
| 1-amino-2-chloro-4-methyl-benzene | do | Do. |
| 1-amino-2-bromo-4-methyl-benzene | do | Do. |
| 1-amino-2-chloro-4-methoxy-benzene | do | Do. |
| 1-amino-2-methoxy-4-nitro-benzene | do | Do. |
| 1-amino-2-bromo-4-methoxy-benzene | do | Do. |
| 1-amino-4-chloro-2-methoxy-benzene | do | Do. |
| 1-amino-4-bromo-2-ethoxy-benzene | do | Do. |
| o-Xenylamine | do | Do. |
| p-Xenylamine | do | Do. |
| o-Bromoaniline | do | Do. |
| m-Bromoaniline | do | Do. |
| p-Bromoaniline | do | Do. |
| o-Chloroaniline | do | Do. |
| m-Chloroaniline | do | Do. |
| p-Chloroaniline | do | Do. |
| 1-amino-4-methyl-3-nitro-benzene | do | Do. |
| 1-amino-5-chloro-2-methoxy-benzene | do | Do. |
| 1-amino-2,4-dichlorobenzene | do | Do. |
| 1-amino-2,5-dichlorobenzene | do | Do. |
| p-Amino azobenzene | do | Do. |
| a-Naphthylamine | do | Do. |
| p-Aminobenzophenone | do | Do. |
| 1-amino-4-fluoro-2-nitro-benzene | 5-methyl-1,3-cyclohexadione | Green-yellow. |
| 1-amino-4-fluoro-2-nitro-benzene | 5,5-dimethyl-1,3-cyclo-hexadione | Do. |
| 1-amino-4-di-B-hydroxyethyl-amino-2-nitro-benzene | 5-methyl-1,3-cyclo-hexadione | Red. |
| o-Methyl-p-ethylaniline | 5-methyl-1,3-cyclo-hexadione | Green-yellow. |
| o-Methyl-p-ethylaniline | 5,5-dimethyl-1,3-cyclo-hexadione | Do. |
| o-Ω-hydroxyethoxyaniline | do | Do. |
| p-Ω-hydroxyethoxyaniline | do | Do. |
| o-Nitro-p-B-hydroyethylaniline | do | Do. |

In order that our invention may be clearly understood the application of the compounds of the invention to the dyeing of materials made of or containing an organic derivative of cellulose, and more particularly cellulose acetate silk, is described hereinafter. Although the remarks are more particularly directed to the dyeing of the above mentioned materials those pertaining to the general method ordinarily employed and the amounts of dispersing agent and dye which may be employed, for example, are of general applicability. The general methods by which the dye compounds may be applied to the coloration of other materials are well known in the art and need not be described here.

In employing the aryl azo derivatives of our invention as dyes, they will ordinarily be applied to the material in the form of an aqueous suspension which can be prepared by grinding the dye to a paste in the presence of a sulfonated oil, soap, or other suitable dispersing agent and dispersing the resulting paste in water. Dyeing operations can, with advantage, be conducted at a temperature of 80-85° C., but any suitable temperature may be used. In accordance with the usual dyeing practice, the material to be dyed will ordinarily be added to the aqueous dye bath at a temperature lower than that at which the main portion of the dyeing is to be effected, a temperature approximating 45-55° C. for example, following which the temperature of the dye bath will be raised to that selected for carrying out the dyeing operation. The temperature at which the dyeing is conducted will vary somewhat, depending, for example, on the particular material or materials undergoing coloration.

The amount of dispersing agent employed may be varied over wide limits. Amounts approximating 10 to 200% by weight on the dye may be employed, for example. These amounts are not to be taken as limits as greater or lesser amounts can be used. To illustrate, if the dye is ground to a sufficiently fine powder dyeing can be satisfactorily carried out without the aid of a dispersing agent. Generally speaking, however, the use of a dispersing agent is desirable.

Advantageously, dyeing is carried out in a substantially neutral dyebath. Perhaps, more accurately, it should be stated that dyeing should not be carried out in an alkaline dyebath, that is, one having any substantial alkalinity, since the presence of free alkali appears to affect the dyeing adversely. Dyeing in an acid dyebath is not recommended because of the tendency of acids to affect the material undergoing dyeing adversely. Because of these considerations when a dispersing agent is to be employed preferably it is neutral or substantially neutral.

It will be understood that the azo compounds of our invention may be applied to the material to be colored in any suitable manner. Coloration may be effected, for example, by dyeing, printing, or stenciling. Dispersing or solubilizing agents that can be employed for preparing suspensions of the dye include soap, sulphoricinoleic acid, salts of sulphoricinoleic acid, a water soluble salt of cellulose phthalate, cellulose succinate or cellulose mono-acetate diphthalate, for example, the sodium, potassium or ammonium salts, and sulfonated oleic, stearic or palmitic acid, or salts thereof, such, for example, as the sodium or ammonium salts.

While it is preferred to effect coloration by applying the dye compound from an aqueous dye bath directly to the material to be colored, the azo compounds of our invention may be applied employing the methods applicable to the so-called ice colors. Briefly, in accordance with this method of dyeing, the amine is absorbed and diazotized on the fiber, after which the dye is formed in situ by developing with a coupling component such as 5-methyl-1,3-cyclohexadione or 5,5-dimethyl-1,3-cyclohexadione, for example. Conversely the material undergoing dyeing or coloration may first be treated to absorb one of said coupling components and the dye subsequently formed in situ by coupling with an aryl diazonium salt.

The following examples illustrate how dyeing may be carried out in accordance with our invention. Quantities are expressed in parts by weight.

*Example A*

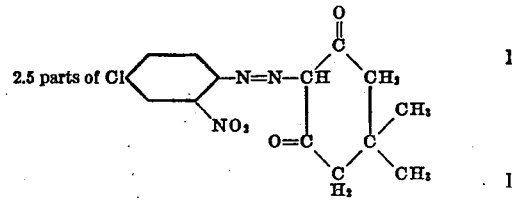

2.5 parts of are finely ground with a dispersing agent such as soap or oleyl glyceryl sulfate and the resulting paste is dispersed in 1000 parts of water. The dispersion thus prepared is heated to a temperature approximating 45-55° C. and 100 parts of cellulose acetate silk, in the form of yarn or fabric, for example, are added to the dyebath after which the temperature is gradually raised to 80-85° C. and the silk worked for several hours at this latter temperature. Sodium chloride may be added as desired during the dyeing operation to promote exhaustion of the dyebath. Upon completion of the dyeing operation the cellulose acetate silk is removed, washed with soap, rinsed and dried. The cellulose acetate silk is colored a greenish-yellow shade of outstanding fastness to light.

*Example B*

By the substitution of 2.5 parts of

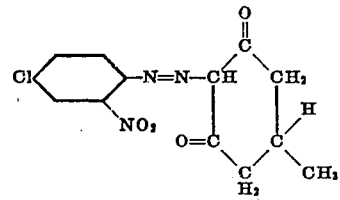

for the dye compound of Example A cellulose acetate silk can likewise be dyed a greenish-yellow shade of outstanding fastness to light in an exactly similar manner as described in said example.

*Example C*

By the substitution of 2.5 parts of

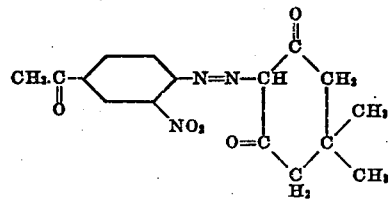

for the dye compound of Example A cellulose actate silk can be dyed a greenish-yellow shade of excellent fastness to light in an exactly similar manner as described in said example.

While our invention has been illustrated in connection with the dyeing of cellulose acetate silk it will be understood that dyeing operations can be carried out in a manner similar to that described above by the substitution of another organic derivative of cellulose material for cellulose acetate silk or by employing dye compounds other than those employed in the examples, or by substitution of both the material being dyed and the dye compounds of the examples.

We claim:

1. An azo compound prepared by coupling a member selected from the class consisting of a 5-alkyl-1,3-cyclohexadione and a 5,5-dialkyl-1,3-cyclohexadione with a diazotized amine selected from the class consisting of amines having the general formulae:

X—⟨⟩—NH₂
    A wherein A represents an alkyl group and X represents a member selected from the class consisting of a halogen atom and a nitro group,

Y—⟨⟩—NH₂
    NO₂ wherein Y represents a member selected from the class consisting of hydrogen, a halogen atom, an alkyl group and an alkoxy group, and

Z—C(=O)—⟨⟩—NH₂
          B wherein B represents a member selected from the class consisting of a nitrogroup and a halogen atom and Z represents an alkyl group.

2. An azo compound prepared by coupling a member selected from the class consisting of a 5-alkyl-1,3-cyclohexadione and a 5,5-dialkyl-1,3-cyclohexadione with a diazotized amine selected from the class consisting of amines having the general formulae:

X—⟨⟩—NH₂
    CH₃ wherein X represents a member selected from the class consisting of a halogen atom and a nitro group,

Y—⟨⟩—NH₂
    NO₂ wherein Y represents a member selected from the class consisting of hydrogen, a halogen atom, an alkyl group and an alkoxy group, and Z—C(=O)—⟨⟩—NH₂
          Cl wherein Z represents an alkyl group.

3. An azo compound prepared by coupling a member selected from the class consisting of 5-methyl-1,3-cyclohexadione and 5,5-dimethyl-1,3-cyclohexadione with a diazotized amine selected from the class consisting of amines having the general formulae:

X—⟨⟩—NH₂
    A wherein A represents an alkyl group and X represents a member selected from the class consisting of a halogen atom and a nitro group,

Y—⟨⟩—NH₂
    NO₂ wherein Y represents a member selected from the class consisting of hydrogen, a halogen atom, an alkyl group and an alkoxy group, and

Z—C(=O)—⟨⟩—NH₂
          B wherein B represents a member selected from the class consisting of a nitro group and a halogen atom and Z represents an alkyl group.

4. An azo compound prepared by coupling a member selected from the class consisting of 5-methyl-1,3-cyclohexadione and 5,5-dimethyl-1,3-cyclohexadione with a diazotized amine selected from the class consisting of amines having the general formulae:

X—⟨⟩—NH₂
    CH₃ wherein X represents a member selected from the class consisting of a halogen atom and a nitro group,

Y—⟨⟩—NH₂
    NO₂ wherein Y represents a member selected from the class consisting of hydrogen, a halogen atom, an alkyl group and an alkoxy group, and Z—C(=O)—⟨⟩—NH₂
          Cl wherein Z represents an alkyl group.

5. An azo compound prepared by coupling a member selected from the class consisting of 5-alkyl-1,3-cyclohexadione and 5,5-dialkyl-1,3-cyclohexadione with a diazotized amine having the general formula:

Y—⟨⟩—NH₂
    NO₂ wherein Y represents a member selected from the class consisting of hydrogen, a halogen atom, an alkyl group and an alkoxy group.

6. An azo compound prepared by coupling a member selected from the class consisting of 5-alkyl-1,3-cyclohexadione and 5,5-dialkyl-1,3-cyclohexadione with a diazotized amine having the formula:

Y—⟨⟩—NH₂
    NO₂ wherein Y represents a halogen atom.

7. A compound having the formula:

[structural formula showing dimethylcyclohexanedione coupled via —C—N=N— to a chloro-nitro-phenyl group]

8. A compound having the formula:

[structural formula showing methylcyclohexanedione coupled via —C—N=N— to a chloro-nitro-phenyl group]

9. A compound having the formula:

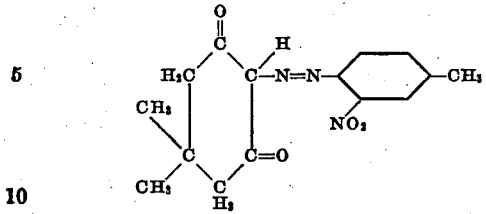

10. The azo dyestuffs of the formula:

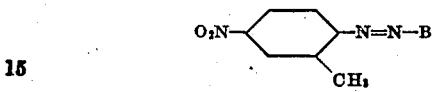

wherein B stands for the radicle of a 1,3-cyclohexadione.

11. Azo dyestuffs corresponding to the general formula

wherein A stands for a radicle of the benzene series containing a nitro group in ortho position to the azo group which is free from carboxylic, carboxylic acid ester, hydroxy, alkoxy and O-acyl groups in ortho position to the azo group and B stands for a radicle of a 1,3-cyclohexadione.

12. Azo dyestuffs corresponding to the general formula

wherein A stands for a radicle of the benzene series containing a nitro group in ortho position to the azo group which is free from carboxylic, carboxylic acid ester, hydroxy, alkoxy and O-acyl groups in the ortho position to the azo group and B stands for the radicle of 1,3-cyclohexadione.

13. Azo dyes having the formula

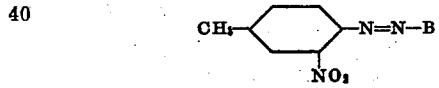

wherein B stands for the radicle of a 1,3-cyclohexadione.

14. Azo dyestuffs corresponding to the formula

wherein A stands for a radicle of the benzene series containing at least one nitro group which is free from carboxylic, carboxylic acid ester, hydroxy, alkoxy and O-acyl groups in the ortho position to the azo group and B stands for a radicle of a 1,3-cyclohexadione.

15. A process of coloring an organic derivative of cellulose which comprises applying thereto a dye selected from the class of azo compounds consisting of the nuclear non-sulfonated aryl azo derivatives of a 1,3-cyclohexadione having an alkyl group in its 5-position.

16. A process of coloring an organic derivative of cellulose which comprises applying thereto an azo dyestuff selected from the group consisting of the nuclear non-sulfonated benzene- and naphthalene-azo derivatives of a 1,3-cyclohexadione.

17. Material made of or comprising an organic derivative of cellulose colored with a dye selected from the class of azo compounds consisting of the nuclear non-sulfonated aryl azo derivatives of a 1,3-cyclohexadione.

18. Material made of or comprising an organic acid ester of cellulose colored with a dye selected from the class of azo compounds consisting of the nuclear non-sulfonated aryl azo derivatives of a 1,3-cyclohexadione.

19. A cellulose acetate colored with a dye selected from the class of azo compounds consisting of the nuclear nonsulfonated aryl azo derivatives of a 1,3-cyclohexadione.

20. A cellulose acetate colored with a dye selected from the class of azo compounds consisting of the nuclear non-sulfonated aryl azo derivatives of a 1,3-cyclohexadione having an alkyl group in its 5-position.

21. A process of coloring an organic derivative of cellulose which comprises applying thereto a dye selected from the class of azo compounds consisting of the nuclear non-sulfonated aryl, said aryl nucleus being substituted with a nitro group, azo derivatives of a 1,3-cyclohexadione.

JAMES G. McNALLY.
JOSEPH B. DICKEY.